(12) United States Patent
Yamaguchi et al.

(10) Patent No.: US 7,609,313 B2
(45) Date of Patent: Oct. 27, 2009

(54) IMAGE PICK-UP LENS, IMAGE PICK-UP UNIT AND MOBILE TERMINAL

(75) Inventors: Susumu Yamaguchi, Hachioji (JP); Masashi Isono, Aichi (JP)

(73) Assignee: Konica Minolta Opto, Inc., Tokyo (JP)

( * ) Notice: Subject to any disclaimer, the term of this patent is extended or adjusted under 35 U.S.C. 154(b) by 753 days.

(21) Appl. No.: 11/128,544

(22) Filed: May 13, 2005

(65) Prior Publication Data
US 2005/0264670 A1 Dec. 1, 2005

(30) Foreign Application Priority Data
May 27, 2004 (JP) .............................. 2004-157667

(51) Int. Cl.
 G02B 13/16 (2006.01)
 H04N 5/225 (2006.01)
 G02B 15/14 (2006.01)
 G02B 9/12 (2006.01)
 G02B 13/18 (2006.01)

(52) U.S. Cl. .................. 348/335; 359/689; 359/716; 359/791

(58) Field of Classification Search ................. 348/335; 359/716, 753, 791
See application file for complete search history.

(56) References Cited
U.S. PATENT DOCUMENTS

| | | | | |
|---|---|---|---|---|
| 5,729,390 A | * | 3/1998 | Abe ............................ | 359/661 |
| 5,786,944 A | * | 7/1998 | Hagimori et al. ............. | 359/689 |
| 6,844,984 B2 | * | 1/2005 | Benedix et al. .............. | 359/679 |
| 6,844,989 B1 | * | 1/2005 | Jo et al. ....................... | 359/716 |
| 7,006,305 B2 | * | 2/2006 | Amanai ....................... | 359/791 |

* cited by examiner

Primary Examiner—Jason Chan
Assistant Examiner—Leslie Virany
(74) Attorney, Agent, or Firm—Cohen Pontani Lieberman & Pavane LLP

(57) ABSTRACT

An image pick-up lens for forming an image of an object on a solid image pick-up element having a rectangular effective pixel area, has a first lens; a second lens; a third lens; and a diaphragm having an aperture. The following conditional expressions are satisfied:

$$15° < IA_D < 35°$$

$$|IA_h - (IA_D \cdot Y_h/Y_D)| < 5°$$

where,
 $Y_D$: a length of ½ of the diagonal length of the rectangular effective pixel area of the solid image pick-up element,
 $Y_h$: an arbitrary image height of the image pick-up lens (where, $Y_h < Y_D$),
 $IA_D$: an angle formed between a chief ray of a light flux forming an image at the image height $Y_D$ of the image pick-up lens and the optical axis, and
 $IA_h$: an angle formed between a chief ray of a light flux image forming an image at the image height $Y_h$ of the image pick-up lens, and the optical axis.

15 Claims, 11 Drawing Sheets

MERIDIONAL COMA

MERIDIONAL COMA

FIG. 9 (b)
FIG. 9 (a)
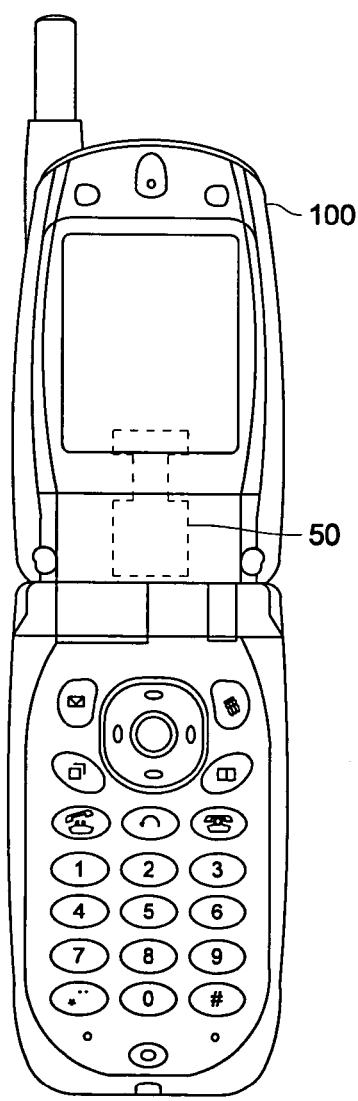
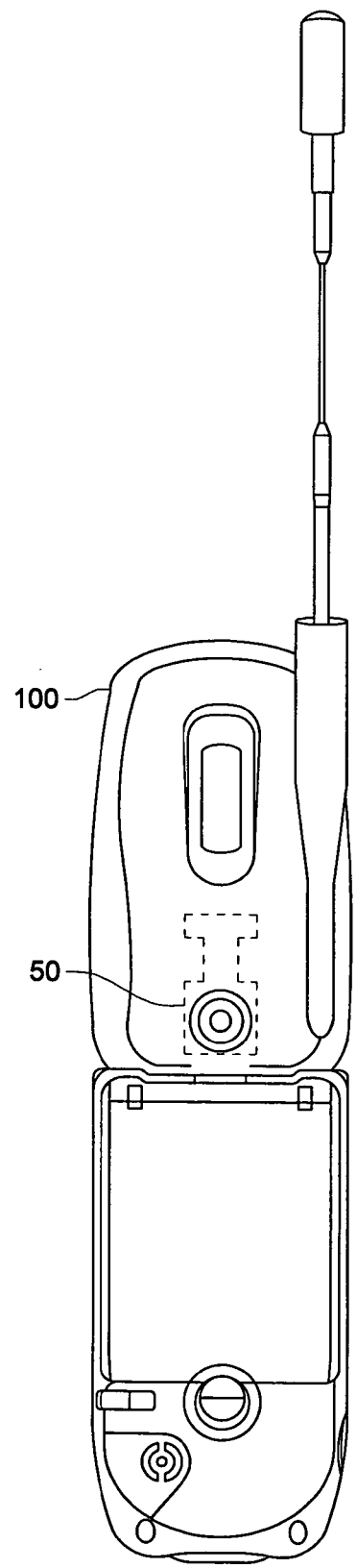

IMAGE PICK-UP LENS, IMAGE PICK-UP UNIT AND MOBILE TERMINAL

This application is based on Japanese Patent Application No. 2004-157667 filed on May 27, 2004, in Japanese Patent Office, the entire content of which is hereby incorporated by reference.

BACKGROUND OF THE INVENTION

The present invention relates to a small sized image pick-up lens using a solid image pick-up element such as CCD type image sensor or CMOS type image sensor, image pick-up unit and mobile terminal provided therewith.

Recently, following making into high performance and size reduction of an image pick-up apparatus using a solid image pick-up element such as CCD (Charge Coupled Device) type image sensor or CMOS (Complementary Metal Oxide Semiconductor) type image sensor, a mobile phone or personal computer provided with the image pick-up apparatus is spreading. Further, for an image pick-up lens mounted in these image pick-up apparatus, a requirement for the further size reduction is increased.

As an image pick-up lens for such an application, from a reason that it can be made into the high performance and further appropriate for the size reduction, as compared to the lens of 1 or 2 lens composition, an image pick-up lens of 3-lens composition composed of, in order from an object side, a positive first lens, positive second lens, and negative third lens, is well known. These image pick-up lenses are disclosed in, for example, Patent Documents 1, 2.

[Patent Document 1] Tokkai No. 2003-322792
[Patent Document 2] Tokkai No. 2004-37960

However, although the image pick-up lenses disclosed in Patent Documents 1, 2, are types appropriate for the size reduction, because Abbe's number of a lens forming the negative third lens is more than 55, and the difference of Abbe's number to the lens material forming the positive first lens and second lens is small, there is a tendency that the on-axial chromatic aberration becomes under correction.

Furthermore, in the image pick-up lens disclosed in Patent Document 2, because a composite focal length of the second lens and the third lens, arranged on the image side from an aperture stop, is a negative value, an exit pupil position is too close to the image pick-up element, a chief ray incident angle (an angle formed between the chief ray and the optical axis, and when the chief ray is parallel to the optical axis, it is 0°) of the light flux image formed on the peripheral part of the image pick-up surface of the image pick-up element, is larger than 45°, and as the image pick-up element, when the solid image pick-up element is used, because the incident angle on the image pick-up element is too large, the phenomenon (shading) in which a substantial aperture efficiency is reduced on the peripheral part of the image pick-up surface is generated, and the peripheral light amount becomes insufficient.

SUMMARY OF THE INVENTION

The present invention is attained in view of such a problem, and an object of the present invention is to provide an image pick-up lens of 3-lenses composition, in which, although it is a small sized one, aberrations are finely corrected, and an incident angle of the chief ray of the light flux image formed on the peripheral part of the solid image pick-up element is suppressed to an appropriate value, and an image pick-up unit using it, and a mobile terminal.

BRIEF DESCRIPTION OF THE DRAWINGS

FIG. 9(a) is a front view of a mobile phone to which the image pick-up unit is applied,
and FIG. 9(b) is a rear view of the mobile phone to which the image pick-up unit is applied.

DETAILED DESCRIPTION OF THE PREFERRED EMBODIMENT

Firstly, structures to attain the above object are described hereinafter.

The image pick-up lens written in item 1 is characterized in that: it is an image pick-up lens for image forming the subject image in the solid image pick-up element; and in order from the object side, it is composed of the first lens of the meniscus shape which has the positive refractive power and whose convex surface is faced to the object side; the second lens of the meniscus shape which has the positive refractive power and whose convex surface is faced to the image side; and the third lens of the meniscus shape which has the negative refractive power and whose convex surface is faced to the image side; and the first lens, second lens, third lens respectively have at least one surface of the aspheric surface, and satisfy the following conditional expressions.

$$15° < IA_D < 35° \tag{1}$$

$$|IA_h - (IA_D \cdot Y_h / Y_D)| < 5° \tag{2}$$

Where,
$Y_D$: ½ of the diagonal length of the rectangular effective pixel area of the solid image pick-up element
$Y_h$: an arbitrary image height of the image pick-up lens (where, $Y_h < Y_D$)
$IA_D$: an angle formed between the chief ray of the light flux image formed in the image height $Y_D$ of the image pick-up lens, and the optical axis
$IA_h$: an angle formed between the chief ray of the light flux image formed in the image height $Y_h$ of the image pick-up lens, and the optical axis.

A basic structure of the present invention for obtaining the image pick-up lens which is a small sized one and whose aberration is finely corrected, is, in order from the object side, the first lens of the meniscus shape which has a positive refractive power and whose convex surface is faced to the object side, aperture stop, the second lens of the meniscus shape which has a positive refractive power and whose convex surface is faced to the image side, and the third lens of the meniscus shape which has a negative refractive power and whose convex surface is faced to the image side. This lens composition of so-called telephoto type in which, in order from the object side, the positive lens group composed of the first lens and the second lens, and the negative third lens are arranged, is a composition advantageous for the size reduction of the lens total length. Further, for the aberration correction, because the positive refractive power is allotted to the first lens and the second lens with the stop between them, generation of the spherical aberration or coma in the positive lens group can be suppressed.

Figure 11:
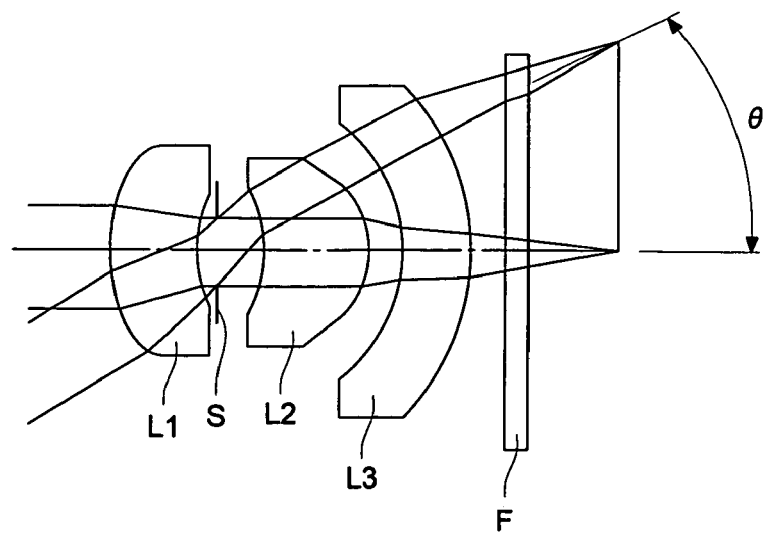
FIG. 11 is a view for explaining an angle of the chief ray.

In the image pick-up lens using the solid image pick-up element, it is important that the exit pupil position of the image pick-up lens is kept at a sufficient distance from the solid image pick-up element to the object side. However, in the recent engineering, by a color filter of the solid image pick-up element or taking a new look at an arrangement of on-chip micro lens array, it becomes possible to decrease the shading. Specifically, to the pixel pitch of the image pick-up surface of the image pick-up element, when a pitch of the arrangement of the color filter or on-chip micro lens array is set slightly small, because, as it advancing to the peripheral part of the image pick-up surface, the color filter or on-chip micro lens array is shifted to the image pick-up lens optical axis side, the oblique incident light flux can be effectively guided to the light receiving part of each pixel. Hereby, the shading generated in the solid image pick-up element can be suppressed small. Hereupon, it is defined that the "chief ray" is a ray which represents the bundle of rays, and which is the center of the bundle of rays. Accordingly, in the case of an example of the image pick-up lens shown in FIG. 11, the angle θ is an angle formed between the chief ray and the optical axis.

Figure 12:
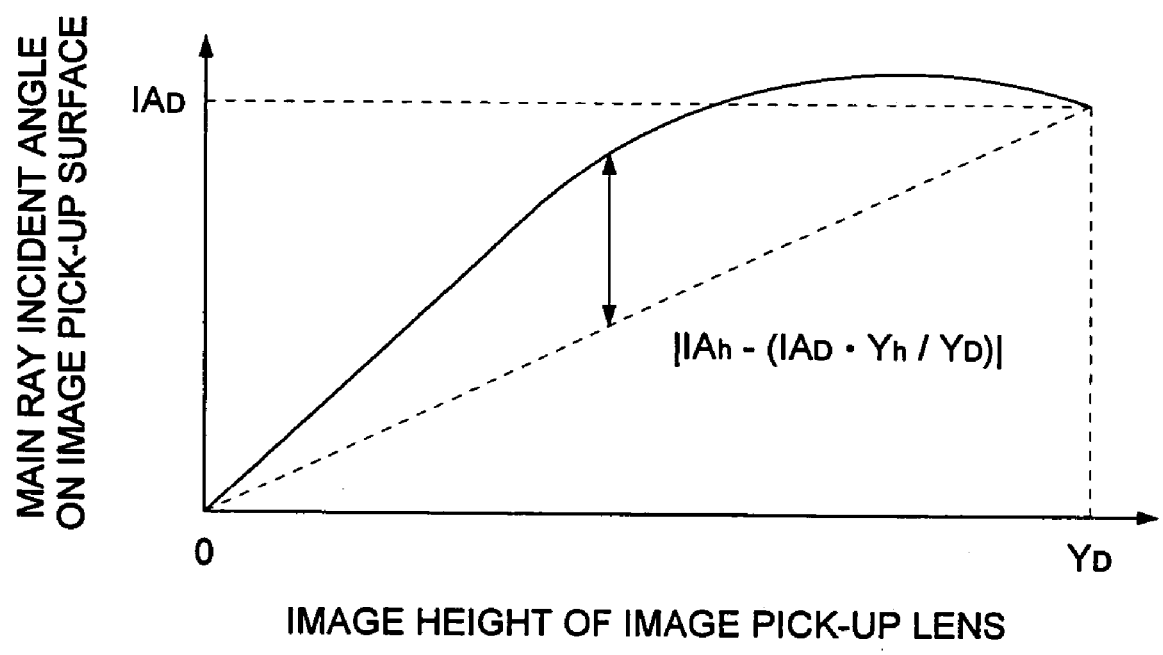
FIG. 12 is a view showing a relationship between an incident angle of the chief ray and an image height of the image pick-up lens.

However, because case where such a countermeasure on the solid image pick-up element side is effective, is a case where the chief ray incident angle of the light flux incident on the image pick-up surface of the solid image pick-up element is gradually increased as advancing to the peripheral part of the image pick-up surface, caution is necessary in the case of the design work of image pick-up lens. For example, when it is tried that the lens total length of the image pick-up lens total system is reduced and an incident angle at the diagonal end of the rectangular effective pixel area of the solid image pick-up element is suppressed small, as shown by a solid line in FIG. 12, there is a tendency to easily have a characteristic that the chief ray incident angle incident on the image pick-up surface of the solid image pick-up element becomes peak (maximum value) in the intermediate part area of the image pick-up surface. Also in the lens type of the present invention, when the aspheric surface is used for the negative third lens, and the shape in which the negative power is reduced at the lens peripheral part (further, the shape in which it has the positive power at the lens peripheral part) is taken, it easily has such a characteristic. In the case of such a characteristic, the shading is generated at the intermediate area of the image pick-up surface, and the image has a sense of incompatibility that the peripheral light amount is lowered in the intermediate area. In contrast to this, when the conditional expressions (1), (2) are satisfied, the shading at the intermediate area can be suppressed.

According to the present invention, the conditional expression (1) regulates conditions for adequately setting an angle formed between the chief ray of the light flux image formed at the diagonal end of the rectangular effective pixel area of the solid image pick-up element and the optical axis. When a value shown in the conditional expression (1) exceeds the lower limit, the lens total length of the total system of the image pick-up lens can be suppressed small. On the one hand, the upper limit is a limit of the angle for which the shading countermeasure by the solid image pick-up element is possible, and it is desirable that the value shown in the conditional expression (1) is lower than the limit. Hereupon, it is more desirable when the following expression is satisfied.

$$15°<IA_D<30°\quad(1)'$$

The conditional expression (2) regulates a characteristic of an angle formed between the chief ray of the light flux image formed at the diagonal end of the rectangular effective pixel area of the solid image pick-up element and the optical axis, to the image height of the image pick-up lens. When the conditional expression is satisfied, the angle formed between the chief ray and the optical axis is increased almost in proportion to the largeness of the image height, and the shading countermeasure by the color filter of the solid image pick-up element or a review of the arrangement of the on-chip micro lens array is more effective. Hereupon, it is more desirable when the following expression is satisfied.

$$|IA_h-(IA_D \cdot Y_h/Y_D)|<3°\quad(2)'$$

The image pick-up lens written in item 2 is characterized in that: in the invention written in item 1, the following conditional expression is satisfied.

$$20<\{(v1+v2)/2\}-v3<70\quad(3)$$

Where,
v1: Abbe's number of the first lens
v2: Abbe's number of the second lens
v3: Abbe's number of the third lens.

The conditional expression (3) regulates conditions for finely correcting the chromatic aberration of the total system of the image pick-up lens. When a value shown in the conditional expression (3) exceeds the lower limit, the on-axis chromatic aberration, magnification chromatic aberration can be corrected with well balance. Further, when the value is lower than the upper limit, the lens can be structured by good available optical materials. Hereupon, it is more desirable when the following expression is satisfied.

$$25<\{(v1+v2)/2\}-v3<60\quad(3)'$$

An image pick-up lens written in item 3 is characterized in that: in the invention written in item 1, the following conditional expressions is satisfied.

$$1.0<f23/f<3.0\quad(4)$$

Where, f23: composite focal length of the second lens and the third lens, and f: focal length of the total system of the image pick-up lenses.

The conditional expression (4) is an expression for regulating the composite focal length of the positive second lens and negative third lens, arranged on the image side from the aperture stop. When a value shown in the conditional expression (4) exceeds the lower limit, the positive composite focal length of the second lens and the third lens is not too small, because it can be avoided that the principal point position of the total system of the image pick-up lenses is too close to the image side, the lens total length of the total system of the image pick-up lenses (the distance on the optical axis from the object side surface to the image side focus of the total system of the image pick-up lenses) can be suppressed small. Further, when the value shown in the conditional expression (4) is lower than the upper limit, because the positive refractive power of the second lens and the third lens can be appropriately secured, and as the result, because the exit pupil position can be kept a distance from the solid image pick-up element to the object side, the chief ray incident angle of the light flux image formed on the peripheral part of the image pick-up surface of the solid image pick-up element, (which is an angle formed between the chief ray and the optical axis, and when the light flux is parallel to the optical axis, the angle is 0°), can be suppressed small. As the result, the phenomenon (shading) in which the substantial aperture efficiency decreases on the peripheral part of the image pick-up surface can be suppressed. Hereupon, it is more preferable when the following expression is satisfied.

$$1.0 < f23/f < 2.0 \quad (4)'$$

In the present invention, the shape of the third lens is a meniscus shape in which the convex surface is faced to the image side, however, from a viewpoint of the incident angle of the chief ray on the solid image pick-up element, as compared to a case where the third lens image side surface is concave surface, there is a merit that the incident angle of the chief ray of the light flux image formed on the peripheral part of the image pick-up surface of the solid image pick-up element can be suppressed small. Further, under the conditional expression (4), because the negative refractive power of the third lens can not be so much large, there is a tendency that the negative third lens is not both concave shape, but the meniscus shape, however, in order to finely correct the on-axial chromatic aberration, it is effective that a negative operation surface of the third lens whose Abbe's number is small, is on the object side surface close to the stop, and also from a viewpoint of the aberration correction, it is preferable that the shape of the negative third lens is a meniscus shape in which the convex surface is faced to the image side.

The image pick-up lens written in item 4 is, in the invention written in item 1, characterized in that: the following conditional expressions are satisfied.

$$0.15 < f2/f1 < 0.60 \quad (5)$$

Where, f1: a focal length of the first lens, and f2: a focal length of the second lens.

In the present invention, the conditional expression (5) regulates conditions for adequately setting the refractive power distribution of the positive first lens and second lens while finely correcting aberrations. When a value shown in the conditional expression (5) exceeds the lower limit, the refractive power of the positive first lens can be adequately secured, and the total length of the image pick-up lens total system can be suppressed small. On the one hand, when a value shown in the conditional expression (5) is lower than the upper limit, the refractive power of the positive second lens can be adequately secured, and the exit pupil position of the image pick-up lens can be away from the solid image pick-up element to the object side. Hereupon, it is more preferable when the following expression is satisfied.

$$0.15 < f2/f1 < 0.4 \quad (5)'$$

The image pick-up lens written in item 5 is, in the invention written in item 1, characterized in that: the following conditional expressions are satisfied.

$$0.20 < r4/\{1-N2\}\cdot f\} < 0.60 \quad (6)$$

Where, r4: a radius of curvature of the image side surface of the second lens,

N2: a refractive index for d-line of the second lens, and f: a focal length of the image pick-up lens total system.

The conditional expression (6) regulates conditions for adequately setting the positive refractive power of the second lens image side surface. Herein, because a focal length of the second lens image side surface is calculated by using the radius of curvature r4 and the refractive index N2 of the second lens, by $r4/(1-N2)$, the conditional expression (6) is an expression for expressing a ratio of the focal length of the second lens image side surface and the focal length of the image pick-up lens total system. When a value shown in the conditional expression (6) exceeds the lower limit, the refractive power of the second lens image side surface is not too larger than it is necessary, and the generation of the coma flare of off-axis light flux or barrel type distortion aberration can be suppressed. Further, the radius of curvature of the second surface is not too small, and it is preferable also from the viewpoint of the processability of the lens. On the one hand, when the value shown in the conditional expression (6) is lower than the upper limit, because the refractive power of the second lens images side surface can be appropriately secured, the off-axis aberrations generated in the negative third lens can be corrected in the well balanced condition. Hereupon, it is more desirable when the following expression is satisfied.

$$0.25 < r4/\{(1-N2)\cdot f\} < 0.45 \quad (6)'$$

An image pick-up unit written in item 6 is characterized in that: it is an image pick-up unit which is integrally formed with: the solid image pick-up element provided with a photo-electric conversion unit; the image pick-up lens written in any one of items 1 to 5, by which the subject image is formed in the photo-electric conversion unit of the solid image pick-up element; a substrate which holds the solid image pick-up element and has an external connection-use terminal for sending and receiving the electric signals; and a casing formed of a light shielding member which has an aperture for light incidence from the object side; and the height in the optical axis direction of the image pick-up lens of the image pick-up unit is not larger than 10 [mm]. Therefore, it can also be mounted in the thin type mobile terminal such as, for example, a mobile phone.

A mobile terminal written in item 7 is characterized in that: it is provided with the image pick-up unit written in item 6. When the image pick-up unit of the present invention is used, a mobile terminal provided with smaller sized and high-performance image pick-up function can be obtained.

An image pick-up lens written in item 8 is characterized in that: it is an image pick-up lens for image forming a subject image in a solid image pick-up element, and composed of; in order from the object side, the first lens which has a positive refractive power and whose convex surface is faced to the object side; an aperture stop; the second lens of the meniscus shape which has a positive refractive power and whose convex surface is faced to the image side; and the third lens of the meniscus shape which has a negative refractive power and whose convex surface is faced to the image side; and satisfies the following conditional expressions.

$$20 < \{(v1+v2)/2\} - v3 < 70 \quad (3)$$

$$1.0 < f23/f < 3.0 \quad (4)$$

Where, v1: Abbe's number of the first lens v2: Abbe's number of the second lens v3: Abbe's number of the third lens f23: composite focal distance of the second lens and the third lens, and f: focal distance of the total system of the image pick-up lenses.

A basic structure of the present invention for obtaining the image pick-up lens which is a small sized one and whose aberration is finely corrected, is, in order from the object side, the first lens which has a positive refractive power and whose convex surface is faced to the object side, aperture stop, the second lens of the meniscus shape which has a positive refractive power and whose convex surface is faced to the image side, and the third lens of the meniscus shape which has a negative refractive power and whose convex surface is faced to the image side. This lens composition of so-called telephoto type in which, in order from the object side, the positive lens group composed of the first lens and the second lens, and the negative third lens are arranged, is a composition advantageous for the size reduction of the lens total length. Further, for the aberration correction, because the positive refractive power is allotted to the first lens and the second lens with the stop between them, generation of the spherical aberration or coma in the positive lens group can be suppressed.

The conditional expression (3) regulates a condition for finely correcting the chromatic aberration of the total system of image pick-up lenses. When a value shown in the conditional expression (3) exceeds the lower limit, the on-axial chromatic aberration, magnification chromatic aberration can be corrected in well-balanced condition. Further, when the value is lower than the upper limit, the lenses can be composed of the available optical materials. Hereupon, it is more preferable when the following expression is satisfied.

$$25 < \{(v1+v2)/2\} - v3 < 60 \quad (3)'$$

The conditional expression (4) is an expression for regulating the composite focal distance of the positive second lens and negative third lens, arranged on the image side from the aperture stop. When a value shown in the conditional expression (4) exceeds the lower limit, the positive composite focal distance of the second lens and the third lens is not too small, because it can be avoided that the principal point position of the total system of the image pick-up lenses is too close to the image side, the lens total length of the total system of the image pick-up lenses (the distance on the optical axis from the object side surface to the image side focus of the total system of the image pick-up lenses) can be suppressed small. Further, when the value shown in the conditional expression (4) is lower than the upper limit, because the positive refractive power of the second lens and the third lens can be appropriately secured, and as the result, because the exit pupil position can be kept a distance from the solid image pick-up element to the object side, the main ray incident angle of the light flux image formed on the peripheral part of the image pick-up surface of the solid image pick-up element, (which is an angle formed between the main ray and the optical axis, and when the light flux is parallel to the optical axis, the angle is 0°), can be suppressed small. As the result, the phenomenon (shading) in which the substantial aperture efficiency decreases on the peripheral part of the image pick-up surface can be suppressed. Hereupon, it is more preferable when the following expression is satisfied.

$$1.0 < f23/f < 2.0 \quad (4)'$$

In the present invention, the shape of the third lens is a meniscus shape in which the convex surface is faced to the image side, however, from a viewpoint of the incident angle of the main ray on the solid image pick-up element, as compared to a case where the third lens image side surface is concave surface, there is a merit that the incident angle of the main ray of the light flux image formed on the peripheral part of the image pick-up surface of the solid image pick-up element can be suppressed small. Further, under the conditional expression (4), because the negative refractive power of the third lens can not be so much large, there is a tendency that the negative third lens is not both concave shape, but the meniscus shape, however, in order to finely correct the on-axial chromatic aberration, it is effective that a negative operation surface of the third lens whose Abbe's number is small, is on the object side surface close to the stop, and also from a viewpoint of the aberration correction, it is preferable that the shape of the negative third lens is a meniscus shape in which the convex surface is faced to the image side.

The image pick-up lens written in item 9 is, in the invention written in item 8, characterized in that: the first lens is a meniscus shape whose convex surface is faced to the object side.

According to the present invention, when the first lens is the meniscus shape whose convex surface is faced to the object side, the shapes of the first lens and the second lens are symmetrical shape with the stop between them, and coma generated in the first lens and the second lens can be finely corrected. Further, it becomes a composition which can easily correct the magnification chromatic aberration or distortion aberration of the image pick-up lens total system.

The image pick-up lens written in item 10 is, in the invention written in item 8, characterized in that: the following conditional expressions are satisfied.

$$0.15 < f2/f1 < 0.60 \quad (5)$$

Where, f1: a focal distance of the first lens, and f2: a focal distance of the second lens.

In the present invention, the conditional expression (5) regulates conditions for adequately setting the refractive power distribution of the positive first lens and second lens while finely correcting aberrations. When a value shown in the conditional expression (5) exceeds the lower limit, the refractive power of the positive first lens can be adequately secured, and the total length of the image pick-up lens total system can be suppressed small. On the one hand, when a value shown in the conditional expression (5) is lower than the upper limit, the refractive power of the positive second lens can be adequately secured, and the exit pupil position of the image pick-up lens can be away from the solid image pick-up element to the object side. Hereupon, it is more preferable when the following expression is satisfied.

$$0.15 < f2/f1 < 0.4 \quad (5)'$$

The image pick-up lens written in item 11 is, in the invention written in item 8, characterized in that: the following conditional expressions are satisfied.

$$0.20 < r4/\{1-N2\} \cdot f\} < 0.60 \quad (6)$$

Where, r4: a radius of curvature of the image side surface of the second lens,

N2: a refractive index for d-line of the second lens, and f: a focal length of the image pick-up lens total system.

The conditional expression (6) regulates conditions for adequately setting the positive refractive power of the second lens image side surface. Herein, because a focal distance of the second lens image side surface is calculated by using the radius of curvature r4 and the refractive index N2 of the second lens, by r4/(1−N2), the conditional expression (6) is an expression for expressing a ratio of the focal distance of the second lens image side surface and the focal distance of the image pick-up lens total system. When a value shown in the conditional expression (6) exceeds the lower limit, the refractive power of the second lens image side surface is not too larger than it is necessary, and the generation of the coma flare of off-axis light flux or barrel type distortion aberration can be suppressed. Further, the radius of curvature of the second surface is not too small, and it is preferable also from the viewpoint of the processability of the lens. On the one hand, when the value shown in the conditional expression (6) is lower than the upper limit, because the refractive power of the second lens images side surface can be appropriately secured, the off-axis aberrations generated in the negative third lens can be corrected in the well balanced condition. Hereupon, it is more desirable when the following expression is satisfied.

$$0.25 < r4/\{(1-N2) \cdot f\} < 0.45 \qquad (6)'$$

The image pick-up lens written in item 12 is, in the invention written in any one of items 8 to 11, characterized in that: the first lens, second lens and third lens respectively have at least one surface of the aspheric surface.

According to the present invention, when the first lens, second lens and third lens respectively have at least one surface of the aspheric surface, the aberration correction can be conducted more finely. When at least one surface of aspheric surface is added to the positive first lens and second lens, the spherical aberration or coma can be finely corrected. Further, when at least one surface of aspheric surface is added to the negative third lens, the curvature of the field or distortion aberration can be finely corrected.

An image pick-up unit written in item 13 is characterized in that: it is an image pick-up unit which is integrally formed with: the solid image pick-up element provided with a photo-electric conversion unit; the image pick-up lens written in any one of items 8 to 12, by which the subject image is formed in the photo-electric conversion unit of the solid image pick-up element; a substrate which holds the solid image pick-up element and has an external connection-use terminal for sending and receiving the electric signals; and a casing formed of a light shielding member which has an aperture for light incidence from the object side; and the height in the optical axis direction of the image pick-up lens of the image pick-up unit is not larger than 10 [mm]. Therefore, it can also be mounted in the thin type mobile terminal such as, for example, a mobile phone.

A mobile terminal written in item 14 is characterized in that: it is provided with the image pick-up unit written in item 13. When the image pick-up unit of the present invention is used, a mobile terminal provided with smaller sized and high-performance image pick-up function can be obtained.

According to the present invention, a 3-lens composition image pick-up lens in which, although it is a small sized one, aberrations are finely corrected and an incident angle of the chief ray of the light flux, image formed at a peripheral part of the solid image pick-up element, is suppressed to an appropriate value, an image pick-up unit using it, and a mobile terminal can be provided.

Figure 7:
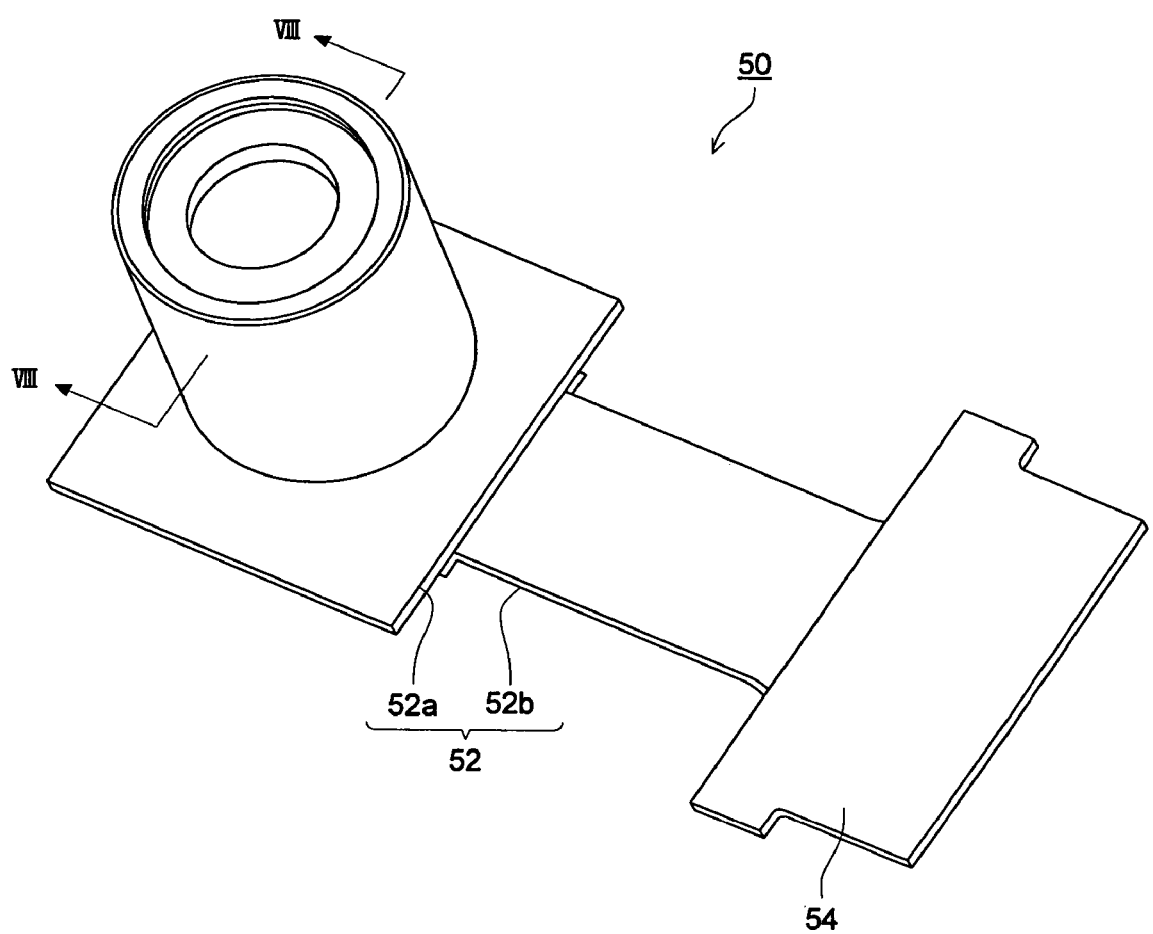
FIG. 7 is a perspective view of an image pick-up unit apparatus.
Figure 8:
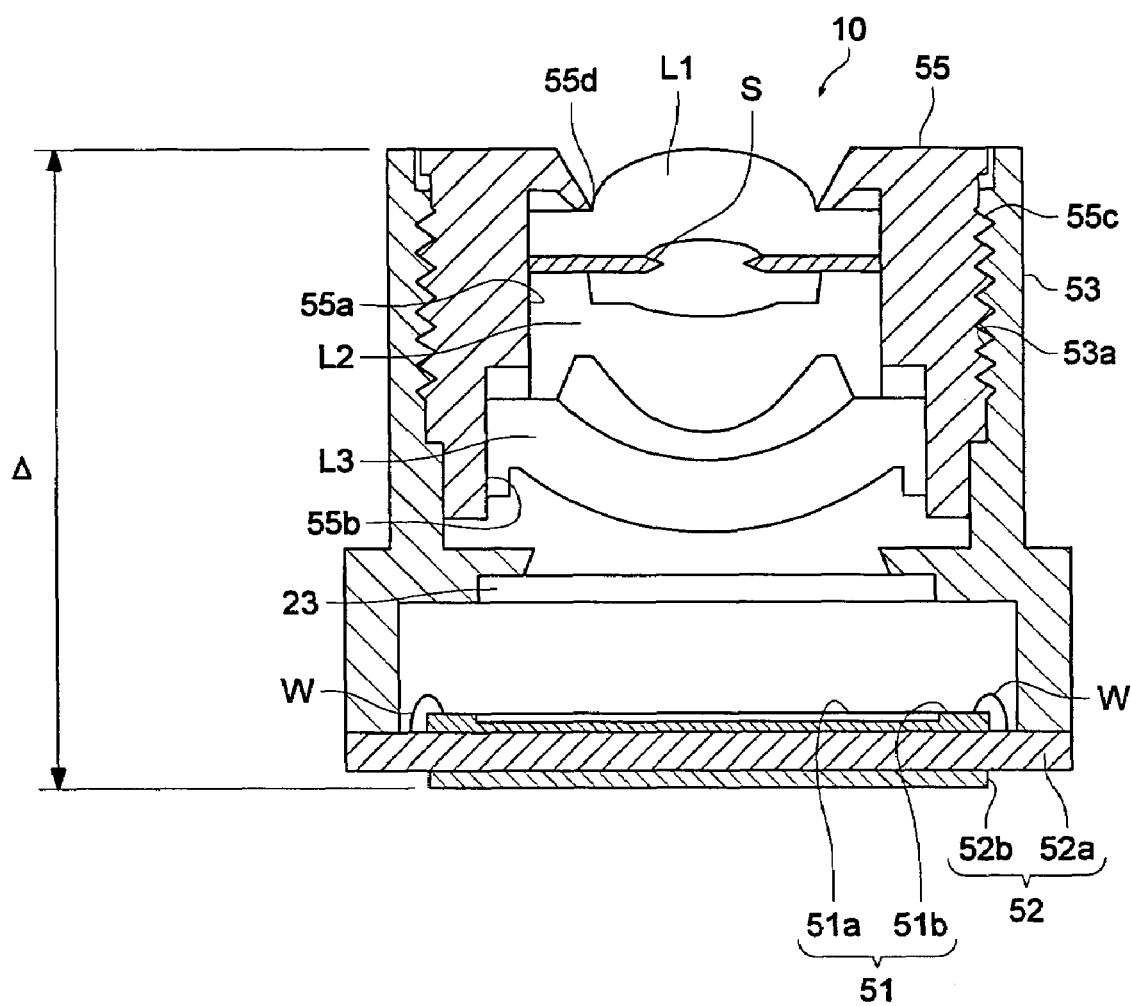
FIG. 8 is a sectional view showing an embodiment of the image pick-up unit apparatus using a small sized image pick-up lens.

Based on the drawings, embodiments of the present invention will be described below. FIG. 7 is a perspective view of an image pick-up unit 50 according to the present embodiment, and FIG. 8 is a sectional view of the image pick-up unit along the surface including VIII-VIII line.

The image pick-up unit 50 is provided with: CMOS type image sensor 51 as a solid image pick-up element having a photo-electric conversion unit 51a; image pick-up lens 10 as the image pick-up lens for imaging the subject image in the photo-electric conversion unit 51a of this image sensor 51; substrate 52 which holds the image sensor 51 and has an external connection-use terminal 54 for sending and receiving its electric signal; and casing 53 which has an aperture part 55d for the light incidence from the object side, and which is as a lens barrel formed of the light shielding member, and they are integrally formed. Hereupon, the height A in the optical axis direction of the present image pick-up unit 50 is not larger than 10 mm.

In the images sensor 51, pixels (photo-electric conversion element) is 2-dimensionally arranged in the central part of the plate on its light receiving side, and at its periphery, a signal processing circuit 51b is formed. Such a signal processing circuit is structured by a drive circuit part by which each pixel is successively driven and a signal charge is obtained, an A/D conversion unit which converts each signal current into digital signal, and a signal processing part by which the image signal output is formed by using this digital signal. Further, in the vicinity of the outer edge of the plate on the light receive side of the image sensor 51, numerous pads (drawing is neglected) are arranged, and through wires W, connected to the substrate 52. The image sensor 51 converts signal charges from the photo-electric conversion unit 51a into image signals such as digital YUV signal, and outputs to a predetermined circuit on the substrate 52 through wires W. Herein, Y is a luminance signal, U (=R−Y) is a color difference signal between red and the luminance signal, and V (B−Y) is a color difference signal between blue and the luminance signal. Hereupon, the image pick-up element is not limited to the CMOS type image sensor, but another element such as CCD may also be used.

The substrate 52 is provided with a supporting plate for supporting the image sensor 51 and casing 53 on its one surface, and a flexible substrate 52b whose one end part is connected to the rear surface (the surface on the opposite side to the image sensor 51) of the supporting plate 52a.

The supporting plate 52a has a many number of signal transmission-use pads provided on the front and back surfaces, and is connected to the wire W of the image sensor 51 on its one plate side, and on the rear surface side, connected to the flexible substrate 52b.

The flexible substrate 52b, whose one end part is connected to the supporting plate 52a as described above, through the external connection-use terminal 54 provided on the other end part, connects the supporting plate 52a to the external circuit (for example, a control circuit which is owned by the host apparatus in which the image pick-up unit is mounted), and can receive the supply of the voltage or clock signal for driving the image sensor 51 from the external circuit, or output the digital YUV signal to the external circuit. Further, an intermediate part in the longitudinal direction of the flexible substrate 52b has the flexibility or deformability, and by its deformation, a degree of freedom is given to the orientation or arrangement of the external output terminal, to the supporting plate 52a.

The casing 53 is fixedly equipped by adhering on the plane on which the image sensor 51 on the supporting plate 52a of the substrate 52 is provided under the condition that the image sensor 51 is housed in its inside. That is, the casing 53 is formed in such a manner that a part on the image sensor 51 side is widely opened so as to surround the image sensor 51, and the other end part is cylindrically formed with a flange having the aperture part 55d, and the end part on the image sensor 51 side is fixed in contact with the supporting plate 52a on the supporting plate 52a. The image pick-up lens 10 is housed and held in the inside of the casing 53.

The image pick-up lens 10 has: in order from the object side, the fist lens L1 which has the positive refractive power and whose convex surface is faced to the object side; stop S;

second lens L2 which has the positive refractive power and the meniscus shape whose convex shape is faced to the image side; and the third lens L3 which has the negative refractive power and the meniscus shape whose convex shape is faced to the image side. Each of lenses L1, L2, L3 is housed in the inside of the casing 53 under the condition that its optical axis and the center line of the casing 53 are coincided with each other.

More specifically, the first lens L1, aperture stop S, second lens L2 are, under the condition that the flange of lenses are in contact with a small diameter part 55a, engaged in the small diameter part 55a of a cylindrical holder 55. On the one hand, the third lens engaged in the large diameter part 55b of the holder 55 is brought into contact with the flange of the second lens L2, and fixed by an adhesive agent, not shown. The holder 55 makes the male screw part 55c formed on its outer periphery screw on the female screw part 53a formed on its inner peripheral surface of the casing 53. Accordingly, when the holder 55 is rotated, the interval between the image pick-up lens 10 and the image sensor 51 can be adjusted. After the adjustment, the holder 55 and the casing 53 are fixed by the adhesive agent, not shown, so that they can not be relatively rotated.

This image pick-up lens 10 is a lens for image forming the subject imaget in the solid image pick-up element, by making the aperture stop S and each of lenses L1, L2, L3 as the optical system. The aperture stop S is a member for determining the F-number of the total system of the image pick-up lens.

The IR cut filter 23 held by the casing 53 between the image pick-up lens 10 and the image sensor 51 is, for example, a member formed rectangularly or circularly.

Further, although illustration is neglected, between the second lens L2 and the third lens L3, a light shield mask may also be arranged, and in this case, it is prevented that the unnecessary light is incident on the outside of the effective diameter of the third lens L3 close to the solid image pick-up element, and the generation of a ghost or a flare can be suppressed.

A mode of use of the image pick-up unit 50 will be described below. FIG. 9 is a view showing a state in which the image pick-up unit 50 is equipped in a mobile phone 100 as a mobile terminal. Further, FIG. 10 is a control block diagram of the mobile phone 100.

The image pick-up unit 50 is arranged in such a manner that, for example, the object side end surface of the casing 53 in the image pick-up lens is provided on the back surface of the mobile phone 100 (a liquid crystal display side is defined as a front surface), and it becomes a position corresponding to a place below the liquid crystal display unit.

The external connection-use terminal 54 of the image pick-up unit 50 is connected to the control unit 101 of the mobile phone 100, and outputs the image signal such as the brightness signal or color difference signal to the control unit 101 side.

Figure 10:
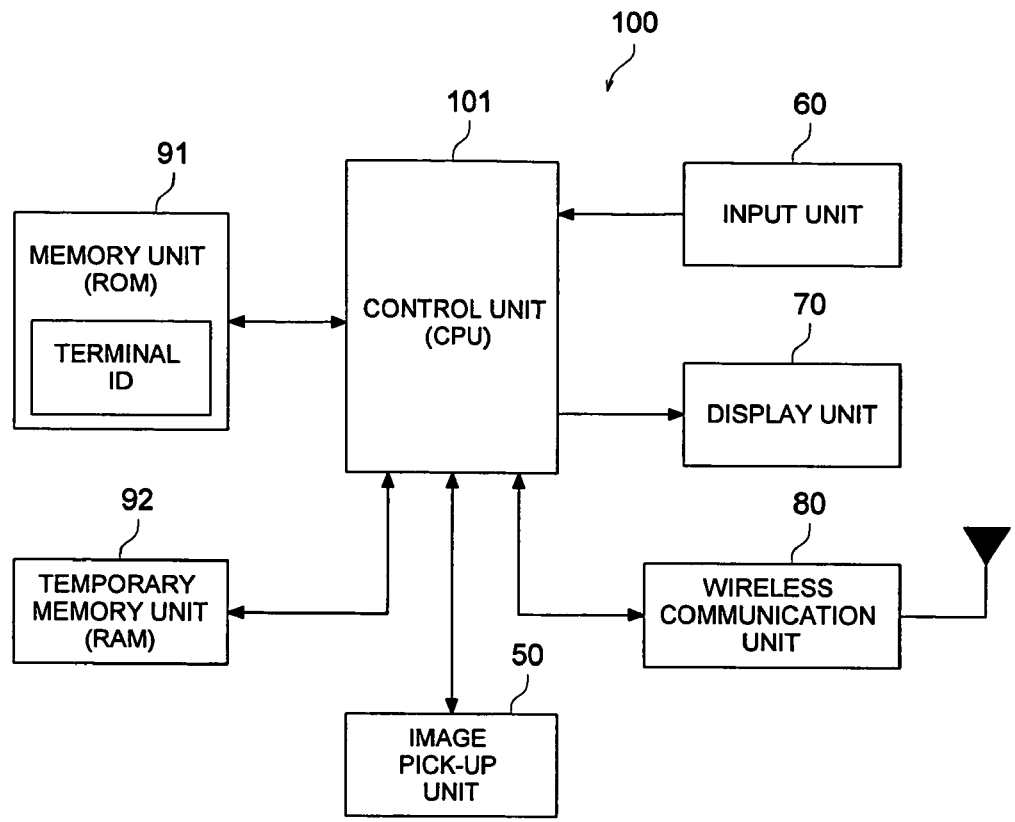
FIG. 10 is a control block diagram of the mobile phone of FIG. 9.

On the one hand, the mobile phone 100 is provided with: a control unit (CPU) 101 which controls, as shown in FIG. 10, each part supervisely, and caries out a program corresponding to each processing; input part 60 for inputting the number by keys; display unit 70 for displaying the image picked-up image or screen image other than the predetermined data; wireless communication unit 80 for realizing each kind of information communication to the external server; memory unit (ROM) 91 in which a system program of the mobile phone 100 or each kind of processing program and necessary data of terminal ID are stored; and temporary memory unit (RAM) 92 which is used as a working area in which each kind of processing program or data carried out by the control unit 101, or processing data, or image picked-up data is temporarily stored.

Then, the image signal inputted from the image pick-up unit 50 is stored in the memory unit 92 or displayed on the display unit 70 by the control system of the mobile phone 100, and further, transmitted to the outside as the screen image information through the wireless communication unit 80.

Examples of the image pick-up lens of the present invention will be shown below. Signs used in each example are as follows.

f: focal length of the total system of the image pick-up lens fB: back focus

F: F-number $2Y_D$: diagonal length of the rectangular effective pixel area of the solid image pick-up element R: radius of curvature D: on-axis surface interval $N_d$: refractive index to d-line of the lens material $v_d$: Abbe's number of the lens material The shape of the aspheric surface in each example, is formed in such a manner that: top of the surface is the origin, X axis is taken in the optical axis direction, and the height in the direction perpendicular to the optical axis is h, and expressed by the following [Math-1].

$$X = \frac{h^2/R}{1+\sqrt{1-(1+K)h^2/R^2}} + \sum A_i h^i \qquad [\text{Math-1}]$$

Where,

Ai: i-order aspheric surface coefficient

R: radius of curvature

K: conic constant

Example 1

The lens of the image pick-up lens of the example 1 will be shown in Tables 1, 2. Hereupon, hereinafter (including the lens data of Table), the exponent of 10 (for example, 2.5× $10^{-03}$) is expressed by E (for example, 2.5 E-03).

TABLE 1

(Example 1)
f = 4.76 mm, fB = 1.29 mm, F = 3.55, $2Y_D$ = 5.76 mm

| Surface No. | R(mm) | D(mm) | $N_d$ | $v_d$ |
|---|---|---|---|---|
| 1 | 1.833 | 1.15 | 1.53180 | 56.0 |
| 2 | 2.484 | 0.23 | | |
| stop | ∞ | 0.63 | | |
| 3 | −2.949 | 1.40 | 1.53180 | 56.0 |
| 4 | −0.865 | 0.43 | | |
| 5 | −1.151 | 0.78 | 1.58300 | 30.0 |
| 6 | −5.236 | 0.50 | | |
| 7 | ∞ | 0.30 | 1.51633 | 64.1 |
| 8 | ∞ | | | |

TABLE 2

Aspheric surface coefficient

| The first surface | K = 8.15240E−01 |
| --- | --- |
| | A4 = 1.15670E−03 |
| | A6 = 2.68720E−04 |
| | A8 = −1.53710E−04 |
| | A10 = 1.63690E−03 |
| | A12 = −7.41830E−04 |
| The second surface | K = 8.10010E+00 |
| | A4 = 3.12300E−02 |
| | A6 = −4.12710E−03 |
| | A8 = 6.36510E−02 |
| | A10 = −1.35200E−01 |
| The third surface | K = 1.98740E+00 |
| | A4 = −3.87450E−02 |
| | A6 = −1.41830E−01 |
| | A8 = 3.05260E−01 |
| | A10 = −1.08580E−01 |
| The fourth surface | K = −2.17580E+00 |
| | A4 = −1.38170E−01 |
| | A6 = 5.20030E−02 |
| | A8 = −2.99170E−02 |
| | A10 = −4.50210E−04 |
| | A12 = 6.72390E−03 |
| The fifth surface | K = −3.38230E+00 |
| | A4 = −4.51040E−02 |
| | A6 = 1.47580E−02 |
| | A8 = 1.09970E−03 |
| | A10 = −2.85830E−04 |
| | A12 = −1.82410E−04 |
| The sixth surface | K = 4.37730E+00 |
| | A4 = −2.44900E−02 |
| | A6 = 7.76740E−03 |
| | A8 = −8.08000E−04 |
| | A10 = −3.05170E−05 |
| | A12 = 7.43360E−06 |

Figure 1:
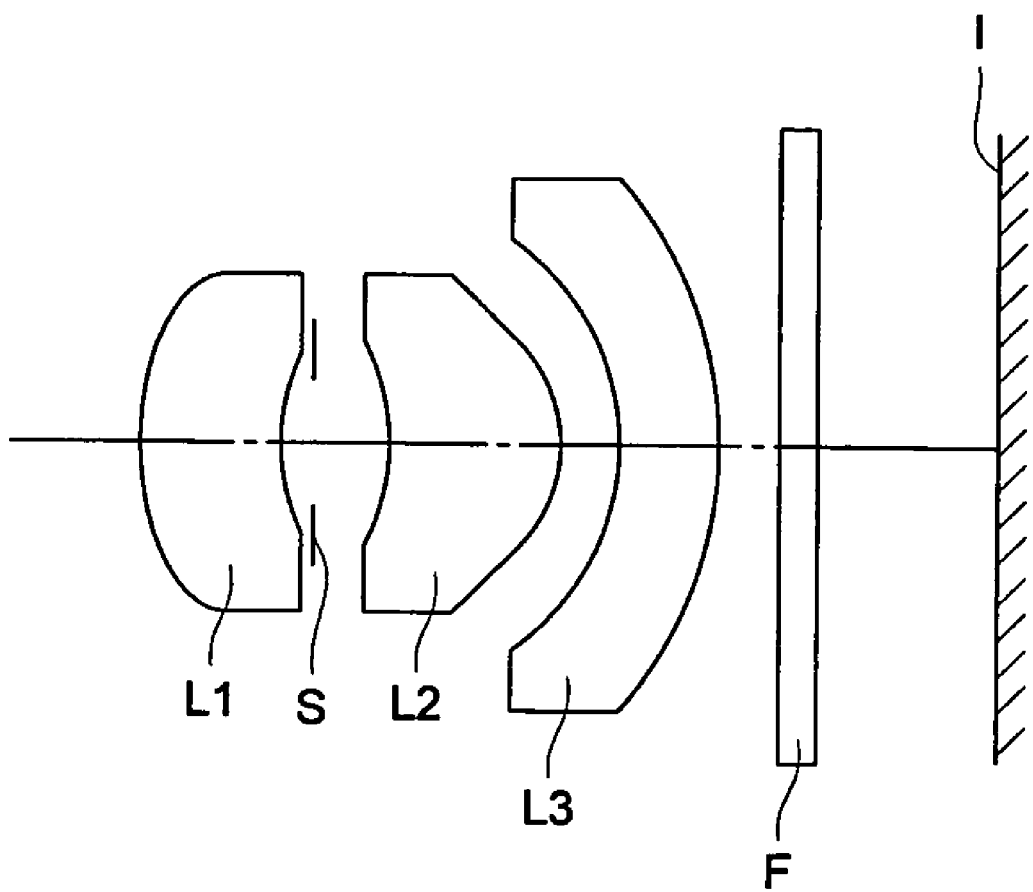
FIG. 1 is a sectional view in the optical axis direction of the image pick-up lens of example 1.
Figure 2:
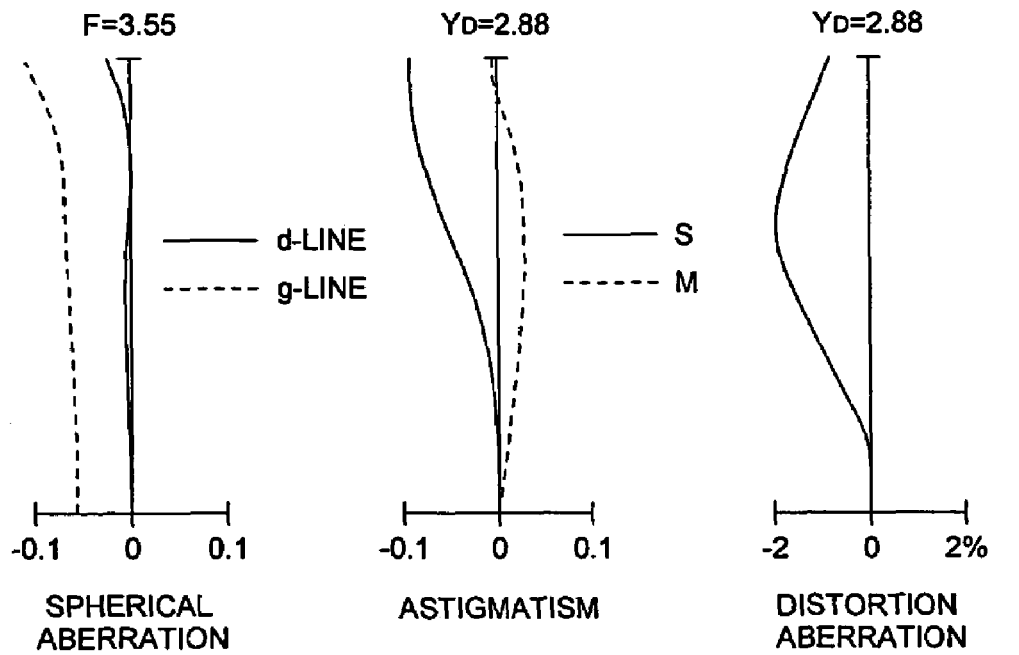
FIG. 2 is aberration views (spherical aberration, astigmatism, distortion aberration, meridional coma) of example 1.
Figure 2:
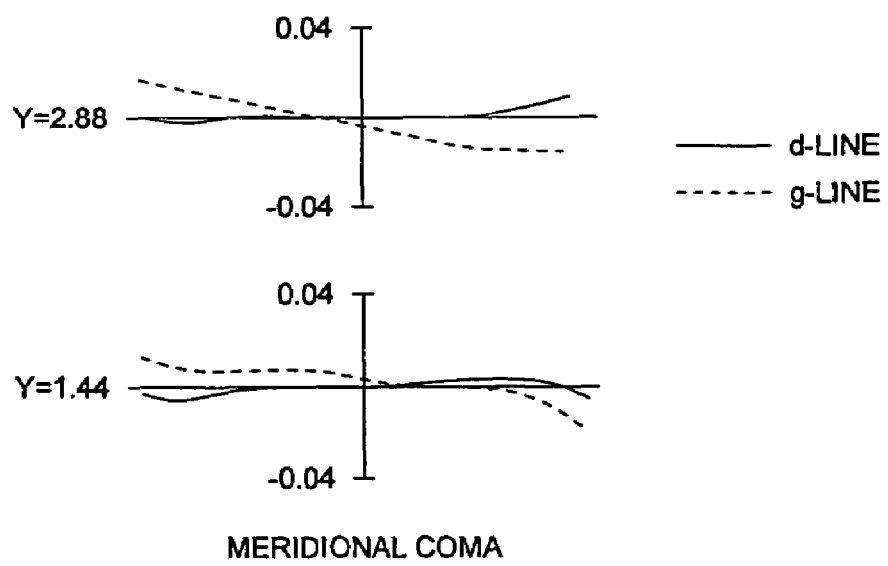

FIG. 1 is a sectional view of the lens of Example 1. In the view, L1 is the first lens, L2 is the second lens, L3 is the third lens and S shows the aperture stop. Further, F is the optical low pass filter or IR-cut filter, the parallel plate in which a seal glass of the solid image pick-up element is assumed. Sign I is the image pick-up surface of the solid image pick-up element. FIG. 2 is aberration view (spherical aberration, astigmatism, distortion aberration, meridional coma) of Example 1.

Example 2

The lens data of the image pick-up lens of Example 2 will be shown in Tables 3, 4.

TABLE 3

(Example 2)
f = 4.74 mm, fB = 1.18 mm, F = 3.55, $2Y_D$ = 5.76 mm

| Surface No. | R(mm) | D(mm) | $N_d$ | $v_d$ |
| --- | --- | --- | --- | --- |
| 1 | 1.754 | 0.90 | 1.53180 | 56.0 |
| 2 | 2.551 | 0.23 | | |
| stop | ∞ | 0.72 | | |
| 3 | −2.775 | 1.31 | 1.53180 | 56.0 |
| 4 | −0.923 | 0.58 | | |
| 5 | −1.060 | 0.77 | 1.58300 | 30.0 |
| 6 | −3.436 | 0.50 | | |
| 7 | ∞ | 0.30 | 1.51633 | 64.1 |
| 8 | ∞ | | | |

TABLE 4

Aspheric surface coefficient

| The first surface | K = 1.00000E+00 |
| --- | --- |
| | A4 = 3.83455E−03 |
| | A6 = −7.74676E−03 |
| | A8 = 7.04763E−03 |
| | A10 = 4.19748E−03 |
| | A12 = −3.78379E−03 |
| The second surface | K = 7.31690E+00 |
| | A4 = 3.82257E−02 |
| | A6 = −2.24935E−02 |
| | A8 = 2.03789E−01 |
| | A10 = −2.05242E−01 |
| The third surface | K = 1.37292E+00 |
| | A4 = −4.84359E−02 |
| | A6 = −1.47866E−01 |
| | A8 = 2.24391E−01 |
| | A10 = −5.66396E−02 |
| The fourth surface | K = −2.33525E+00 |
| | A4 = −1.60082E−01 |
| | A6 = 5.67647E−02 |
| | A8 = −2.67774E−02 |
| | A10 = −2.06476E−03 |
| | A12 = 5.81712E−03 |
| The fifth surface | K = −2.47897E+00 |
| | A4 = −2.61248E−02 |
| | A6 = 1.68687E−02 |
| | A8 = 2.40536E−04 |
| | A10 = −5.42875E−04 |
| | A12 = −3.87552E−05 |
| The sixth surface | K = 1.05726E+00 |
| | A4 = −8.69612E−04 |
| | A6 = 5.23503E−03 |
| | A8 = −7.44161E−04 |
| | A10 = 5.66479E−05 |
| | A12 = 9.94367E−07 |

Figure 3:
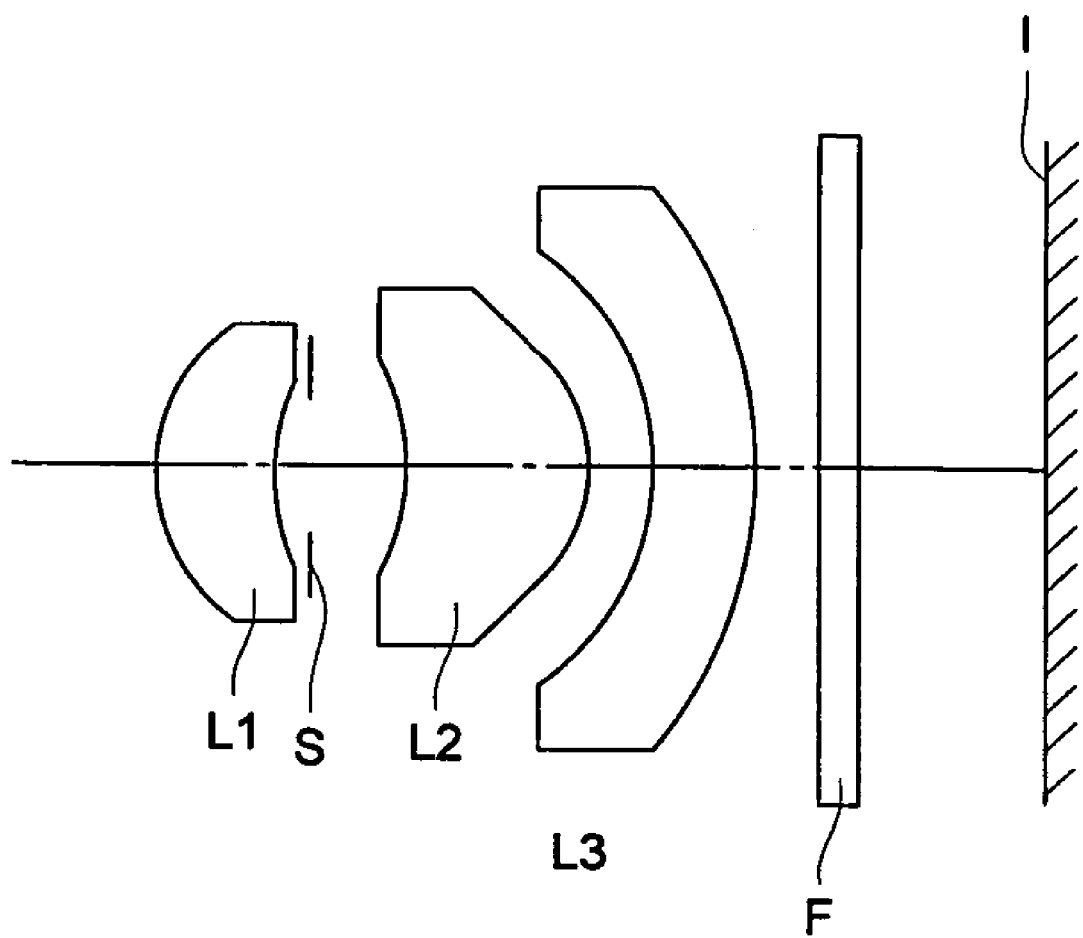
FIG. 3 is a sectional view in the optical axis direction of the image pick-up lens of example 2.
Figure 4:
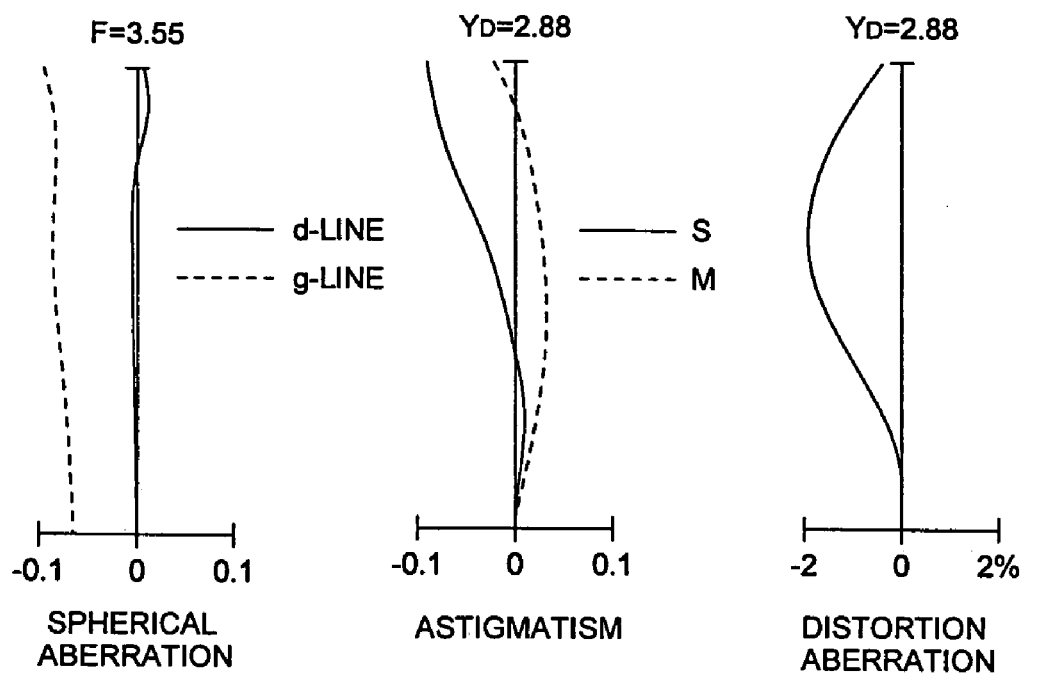
FIG. 4 is aberration views (spherical aberration, astigmatism, distortion aberration, meridional coma) of example 2.
Figure 4:
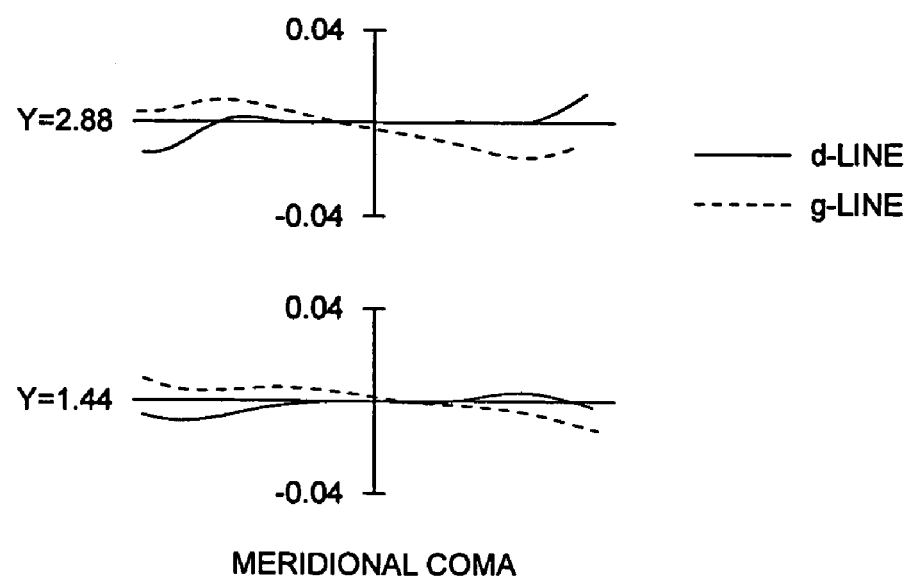

FIG. 3 is a sectional view of the lens of Example 2. In the view, L1 is the first lens, L2 is the second lens, L3 is the third lens and S shows the aperture stop. Further, F is the optical low pass filter or IR-cut filter, the parallel plate in which a seal glass of the solid image pick-up element is assumed. Sign I is the image pick-up surface of the solid image pick-up element. FIG. 4 is aberration view (spherical aberration, astigmatism, distortion aberration, meridional coma) of Example 1.

Example 3

The lens data of the image pick-up lens of Example 3 will be shown in Tables 5, 6.

TABLE 5

(Example 3)
f = 4.74 mm, fB = 1.12 mm, F = 2.88, $2Y_D$ = 5.76 mm

| Surface No. | R(mm) | D(mm) | $N_d$ | $v_d$ |
| --- | --- | --- | --- | --- |
| 1 | 1.934 | 1.14 | 1.53180 | 56.0 |
| 2 | 3.506 | 0.36 | | |
| stop | ∞ | 0.45 | | |
| 3 | −2.125 | 1.42 | 1.53180 | 56.0 |
| 4 | −0.892 | 0.61 | | |
| 5 | −0.883 | 0.90 | 1.58300 | 30.0 |
| 6 | −2.056 | 0.50 | | |
| 7 | ∞ | 0.30 | 1.51633 | 64.1 |
| 8 | ∞ | | | |

TABLE 6

| Aspheric surface coefficient | |
|---|---|
| The first surface | K = 5.81620E−01 |
| | A4 = −5.22970E−03 |
| | A6 = 8.47900E−03 |
| | A8 = −7.49790E−03 |
| | A10 = 3.56630E−03 |
| | A12 = −6.40100E−04 |
| The second surface | K = 8.25360E+00 |
| | A4 = 7.27660E−03 |
| | A6 = −1.45830E−02 |
| | A8 = 2.20510E−02 |
| | A10 = −1.99260E−02 |
| The third surface | K = 4.60860E+00 |
| | A4 = −5.66520E−02 |
| | A6 = −4.85170E−02 |
| | A8 = 9.20040E−02 |
| | A10 = −2.08330E−01 |
| | A12 = 2.31630E−01 |
| The fourth surface | K = −2.20310E+00 |
| | A4 = −1.23930E−01 |
| | A6 = 1.83900E−02 |
| | A8 = −1.58110E−02 |
| | A10 = 5.35900E−03 |
| | A12 = −3.34090E−03 |
| The fifth surface | K = −2.93760E+00 |
| | A4 = −9.77290E−03 |
| | A6 = −2.42990E−03 |
| | A8 = −2.61640E−04 |
| | A10 = 4.09210E−04 |
| | A12 = −2.42210E−05 |
| The sixth surface | K = −8.38010E+00 |
| | A4 = −2.46160E−02 |
| | A6 = 2.81820E−03 |
| | A8 = −7.06320E−04 |
| | A10 = 6.49660E−05 |
| | A12 = −9.38860E−07 |

Figure 5:
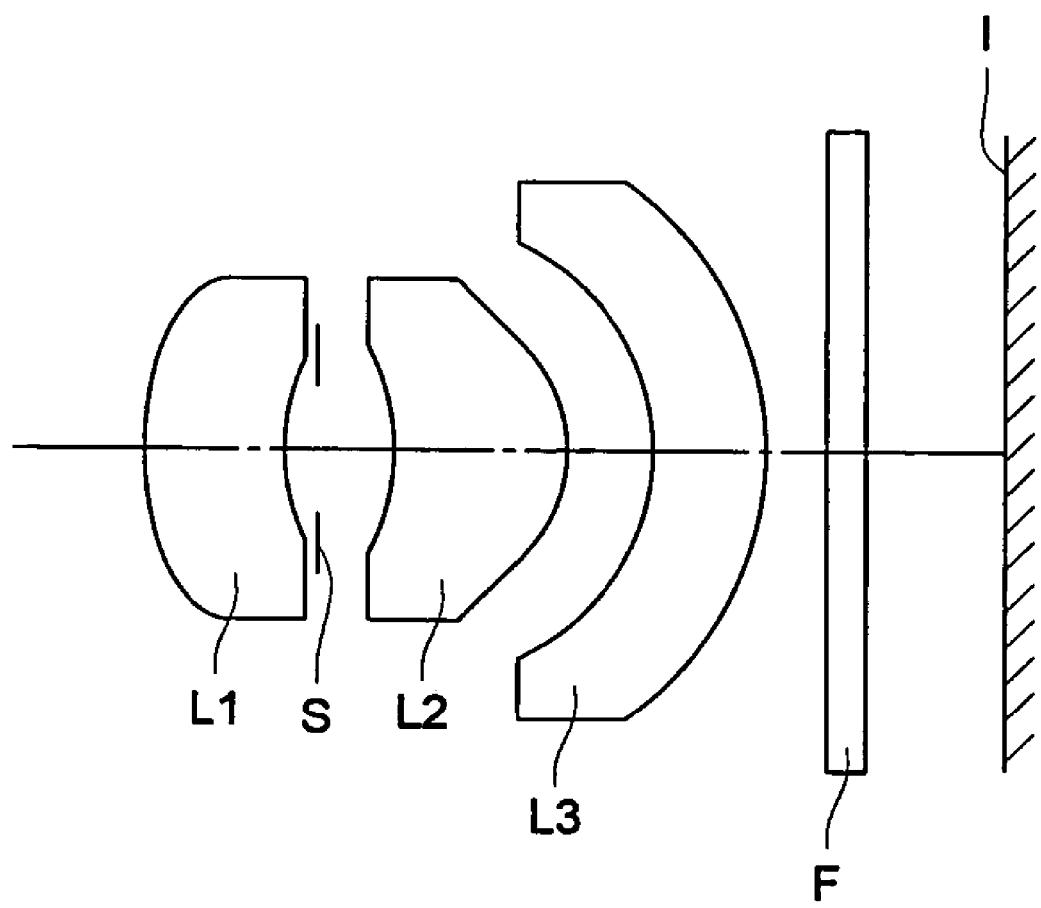
FIG. 5 is a sectional view in the optical axis direction of the image pick-up lens of example 3.
Figure 6:
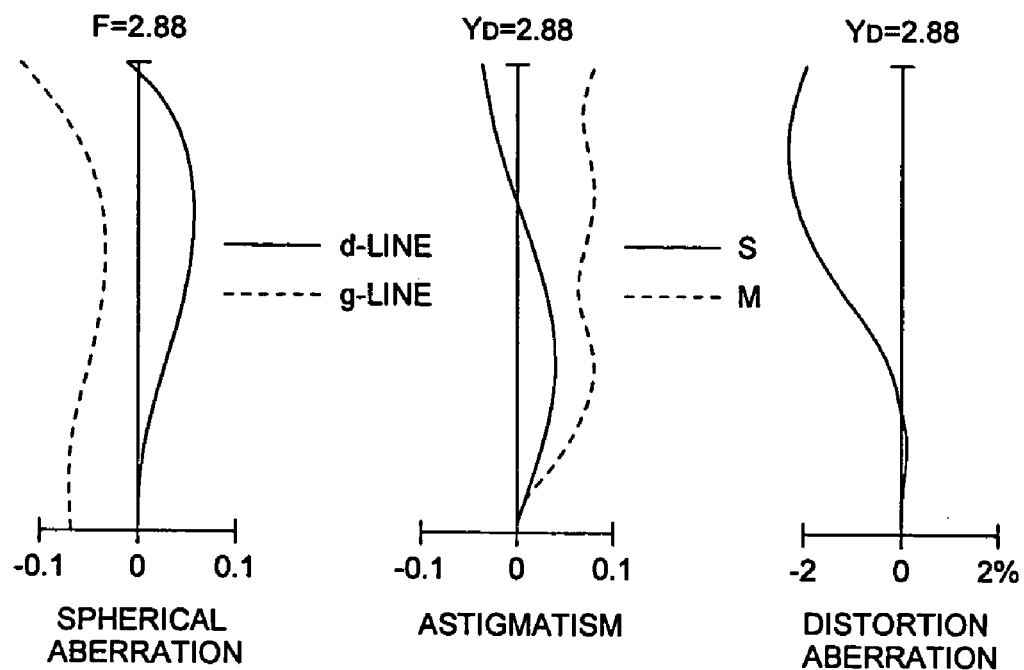
FIG. 6 is aberration views (spherical aberration, astigmatism, distortion aberration, meridional coma) of example 3.
Figure 6:
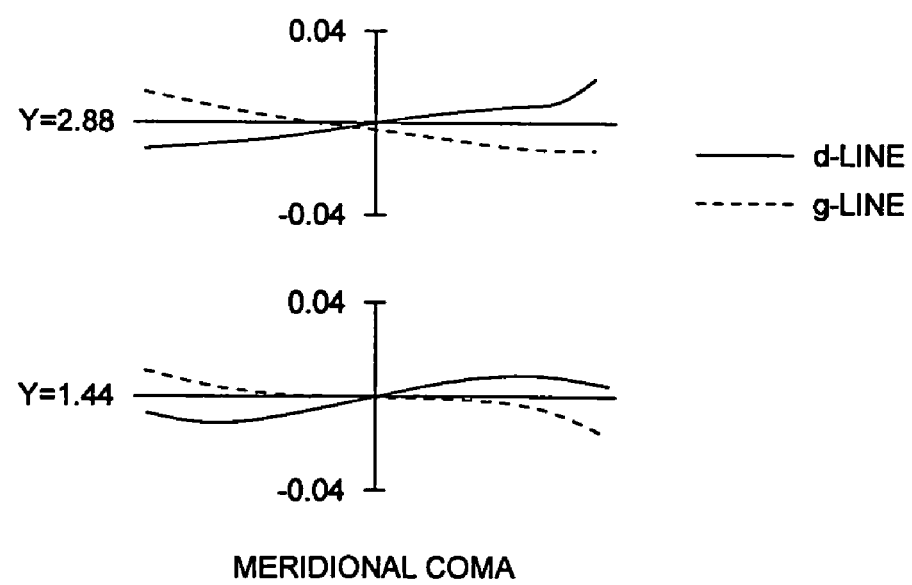

FIG. 5 is a sectional view of the lens of Example 3. In the view, L1 is the first lens, L2 is the second lens, L3 is the third lens and S shows the aperture stop. Further, F is the optical low pass filter or IR-cut filter, the parallel plate in which a seal glass of the solid image pick-up element is assumed. Sign I is the image pick-up surface of the solid image pick-up element. FIG. 6 is aberration view (spherical aberration, astigmatism, distortion aberration, meridional coma) of Example 1.

In each example, values shown in conditional expressions (1)-(2) will be shown in Table 7.

TABLE 7

| | Example 1 | Example 2 | Example 3 |
|---|---|---|---|
| (1) $IA_D(°)$ | 23.8 | 25.6 | 23.5 |
| (2) $|IA_h - (IA_D \cdot Y_h/Y_D)|$ | | | |
| $Y_h = 0.0 * Y_D$ | 0.0 | 0.0 | 0.0 |
| $Y_h = 0.3 * Y_D$ | 2.2 | 1.7 | 1.7 |
| $Y_h = 0.5 * Y_D$ | 2.6 | 1.9 | 2.3 |
| $Y_h = 0.6 * Y_D$ | 2.5 | 1.7 | 2.2 |
| $Y_h = 0.7 * Y_D$ | 2.2 | 1.5 | 1.9 |
| $Y_h = 0.8 * Y_D$ | 1.7 | 1.1 | 1.5 |
| $Y_h = 0.9 * Y_D$ | 1.1 | 0.7 | 0.8 |
| $Y_h = 1.0 * Y_D$ | 0.0 | 0.0 | 0.0 |

(note)
$Y_D$ = 2.88 mm in each example.

In each example, values shown in conditional expressions (3)-(6) will be shown in Table 8.

TABLE 8

| | Example 1 | Example 2 | Example 3 |
|---|---|---|---|
| (3) $\{(v1 + v2)/2\} - v3$ | 26.0 | 26.0 | 26.0 |
| (4) f23/f | 1.30 | 1.49 | 1.38 |
| (5) f2/f1 | 0.23 | 0.28 | 0.32 |
| (6) $r4/\{(1 - N2) \cdot f\}$ | 0.34 | 0.37 | 0.35 |

In the above-described Examples 1, 2, 3, the first lens and second lens are formed of poly-olefin series plastic material, and saturation water absorption is not larger than 0.01%. The third lens is formed of poly-carbonate series plastic material, and the saturation water absorption is 0.4%. Because plastic lens has larger saturation water absorption than glass lens, when sudden humidity change is happened not uniform distribution of an amount of water absorption is transiently generated, the refractive index becomes unequal and there is a tendency that the good image forming performance can not be obtained. In order to suppress the performance deterioration due to the humidity change, it is desirable that the plastic material whose saturation water absorption is entirely not larger than 0.7%, is used.

Herein, because the plastic material has a large refractive index change at the time of temperature change, in the case where all of the first lens, second lens, and third lens are composed of plastic lens, when the environmental temperature is changed, there occurs a problem that the image point position of the entire system of the image pick-up lenses is varied. In the image pick-up unit of the specification in which this image point variation can not be disregarded, for example, the positive first lens is made a lens formed of glass material (for example, glass mold lens), and the positive second lens and negative third lens are made plastic lenses, and when the refractive power distribution is made so that the image point variation at the time of temperature change is some degree cancelled each other by the second lens and third lens, this problem of the temperature characteristic can be lightened. Further, the positive second lens is made a lens formed of glass material, and the positive first lens and the negative third lens may also be made plastic lenses. When the glass mold lens is used, in order to prevent the consumption of the molding die as possible, it is desirable that the glass material whose glass transition point (Tg) is not larger than 400° C., is used.

Further, recently, it is found that, when inorganic minute particles are mixed in the plastic material, the temperature change of the refractive index of the plastic material can be suppressed small. Explaining in detail, in the case where generally minute particles are mixed in the transparent plastic material, because the scattering of the light is generated and transmission factor is lowered, it is difficult to use as the optical material, however, when the size of the minute particle is made smaller than the wavelength of transmission light flux, it possible that the scattering is not substantially generated. Although, in the plastic material, the refractive index is lowered when the temperature rises, in the inorganic particle, the refractive index is increased when the temperature rises. Accordingly, when these temperature dependency are used and made to act so as to be cancelled each other, it is possible to make so that the refractive index change is slightly generated. Specifically, when the inorganic particles whose maximum length is not larger than 20 nm are dispersed in the plastic material as the base material, the plastic material whose temperature dependency of refractive index is vary low is obtained. For example, when the minute particle of niobium oxide ($Nb_2O_5$) is dispersed in acrylic, the refractive index change due to the temperature change can be reduced. In the present invention, when such a plastic material in which the minute particle is dispersed is used for one lens of 2 positive lenses (L1, L2), or all lenses (L1, L2, L3), the image point position variation at the time of temperature change of the image pick-up lens total system can be suppressed small.

What is claimed is:

1. An image pick-up lens for forming an image of an object on a solid image pick-up element having a rectangular effective pixel area, comprising:
    a first lens having a positive refractive power and being a meniscus shape whose convex surface faces to the object side;
    a second lens having a positive refractive power and being a meniscus shape whose convex surface faces to the image side;
    a third lens having a negative refractive power and being a meniscus shape whose convex surface faces to the image side; and
    a diaphragm having an aperture;
    wherein the first lens, the diaphragm, the second lens and the third lens are arranged in this order from the object side and each of the first lens, the second lens and the third lens has at least one aspherical surface, and the following conditional expressions are satisfied:

$15° < IA_D < 35°$ $|IA_h - (IA_D \cdot Y_h/Y_D)| < 5°$ where,
  $Y_D$: a length of ½ of the diagonal length of the rectangular effective pixel area of the solid image pick-up element,
  $Y_h$: an arbitrary image height of the image pick-up lens (where, $Y_h < Y_D$),
  $IA_D$: an angle formed between a chief ray of a light flux forming an image at the image height $Y_D$ of the image pick-up lens and the optical axis, and
  $IA_h$: an angle formed between a chief ray of a light flux image forming an image at the image height $Y_h$ of the image pick-up lens, and the optical axis.

2. The image pick-up lens of claim 1, wherein the following conditional expression is satisfied:

$20 < \{(v1+v2)/2\} - v3 < 70$ where,
  ||1: Abbe's number of the first lens,
  v2: Abbe's number of the second lens, and
  v3: Abbe's number of the third lens.

3. The image pick-up lens of claim 1, wherein the following conditional expression is satisfied:

$1.0 < f23/f < 3.0$ where,
  f23: the composite focal length of the second lens and the third lens, and
  f: the focal length of the total system of the image pick-up lenses.

4. The image pick-up lens of claim 1, wherein the following conditional expression is satisfied:

$0.15 < f2/f1 < 0.60$ where,
  f1: a focal length of the first lens, and
  f2: a focal length of the second lens.

5. The image pick-up lens of claim 1, wherein the following conditional expression is satisfied:

$0.20 < r4/\{1-N2\} \cdot f\} < 0.60$ where,
  r4: a radius of curvature of the image side surface of the second lens,
  N2: a refractive index for d-line of the second lens, and
  f: a focal length of the image pick-up lens total system.

6. An image pick-up unit, comprising:
    a solid image pick-up element provided with a photo-electric conversion unit;
    the image pick-up lens of claim 1 to form an image of an object on the photo-electric conversion unit of the solid image pick-up element;
    a substrate to hold the solid image pick-up element and having an external connection-use terminal for sending and receiving the electric signals; and
    a casing formed of a light shielding member and having an aperture through which light comes from the object side;
    wherein the solid image pick-up element, the image pick-up lens, the substrate, and the casing are integrally formed in one body and the height the image pick-up unit in the optical axis direction of the image pick-up lens 10 mm or less.

7. A mobile terminal, comprising:
    a body, and
    the image pick-up unit of claim 6.

8. An image pick-up unit configured to form an image of an object on a solid image pick-up element, comprising:
    an image pickup lens, comprising:
      a first lens having a positive refractive power and a convex surface facing to the object side;
      a second lens having a positive refractive power and being a meniscus shape whose convex surface faces to the image side; and
      a third lens having a negative refractive power and being a meniscus shape whose convex surface faces to the image side; and
      a diaphragm having an aperture disposed between the first lens and the second lens;
    wherein the first lens, the diaphragm, the second lens, and the third lens are arranged in this order from the object side and the three lenses are configured such that the three lenses together satisfy the following conditional expressions:

$20 < \{(v1+v2)/2\} - v3 < 70$ $1.0 < f23/f < 3.0$ where,
  v1: Abbe's number of the first lens,
  v2: Abbe's number of the second lens,
  v3: Abbe's number of the third lens,
  f23: the composite focal length of the second lens and the third lens, and
  f: the focal length of the total system of the first, second, and third lenses.

9. The image pick-up lens of claim 8, wherein the first lens is a meniscus shape whose convex surface faces to the object side.

10. The image pick-up lens of claim 8, wherein the following conditional expression is satisfied:

$0.15 < f2/f1 < 0.60$ where,
  f1: a focal length of the first lens, and
  f2: a focal length of the second lens.

11. The image pick-up lens of claim 8, wherein the following conditional expression is satisfied:

$0.20 < r4/\{1-N2\} \cdot f\} < 0.60$ where,
- r4: a radius of curvature of the image side surface of the second lens,
- N2: a refractive index for d-line of the second lens, and
- f: a focal length of the image pick-up lens total system.

12. The image pick-up lens of claim 8, wherein each of the first lens, the second lens and the third lens has at least one aspherical surface.

13. An image pick-up unit, comprising:
   a solid image pick-up element provided with a photo-electric conversion unit;
   an image pick-up unit according to claim 8 to form an image of an object on the photo-electric conversion unit of the solid image pick-up element;
   a substrate to hold the solid image pick-up element and having an external connection-use terminal for sending and receiving the electric signals; and
   a casing formed of a light shielding member and having an aperture through which light comes from the object side;
   wherein the solid image pick-up element, the image pick-up lens, the substrate, and the casing are integrally formed in one body and the height the image pick-up unit in the optical axis direction of the image pick-up lens 10 mm or less.

14. A mobile terminal, comprising:
   a body, and
   the image pick-up unit of claim 13.

15. The image pick-up unit according to claim 8, wherein the height of the image pick-up unit in the direction of the optical axis is less than or equal to 10 mm.

* * * * *

UNITED STATES PATENT AND TRADEMARK OFFICE
CERTIFICATE OF CORRECTION

PATENT NO. : 7,609,313 B2  Page 1 of 1
APPLICATION NO. : 11/128544
DATED : October 27, 2009
INVENTOR(S) : Yamaguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1201 days.

Signed and Sealed this

Twelfth Day of October, 2010

David J. Kappos
*Director of the United States Patent and Trademark Office*